(12) United States Patent
Ogawa

(10) Patent No.: US 11,220,166 B2
(45) Date of Patent: Jan. 11, 2022

(54) SEALING MEMBER OF SLIDING DOOR

(71) Applicant: NISHIKAWA RUBBER CO., LTD., Hiroshima (JP)

(72) Inventor: Hirofumi Ogawa, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 72 days.

(21) Appl. No.: 16/748,391

(22) Filed: Jan. 21, 2020

(65) Prior Publication Data

US 2021/0122220 A1 Apr. 29, 2021

Related U.S. Application Data

(60) Provisional application No. 62/925,651, filed on Oct. 24, 2019.

(51) Int. Cl.
*E06B 7/16* (2006.01)
*B60J 10/84* (2016.01)

(52) U.S. Cl.
CPC .................... *B60J 10/84* (2016.02)

(58) Field of Classification Search
CPC ....................................... B60J 10/84
USPC ............................. 49/476.1, 479.1
See application file for complete search history.

(56) References Cited

U.S. PATENT DOCUMENTS

| | | | | |
|---|---|---|---|---|
| 5,024,480 A | * | 6/1991 | Petrelli | B62D 25/07 296/146.9 |
| 5,163,248 A | * | 11/1992 | Bielis | B60J 10/84 49/441 |
| 5,566,510 A | * | 10/1996 | Hollingshead | B29C 45/14409 49/475.1 |
| 6,802,666 B1 | * | 10/2004 | Bormann | B60J 10/21 403/233 |
| 2003/0177700 A1 | * | 9/2003 | Nakai | B60J 10/80 49/479.1 |
| 2015/0360547 A1 | * | 12/2015 | Ogawa | B60J 5/0479 49/368 |
| 2017/0368922 A1 | * | 12/2017 | Kuwabara | B60J 10/25 |
| 2017/0368923 A1 | * | 12/2017 | Kuwabara | B60J 10/84 |
| 2020/0300018 A1 | * | 9/2020 | Kamitani | B60J 10/40 |
| 2021/0122220 A1 | * | 4/2021 | Ogawa | B60J 10/84 |

FOREIGN PATENT DOCUMENTS

| | | | |
|---|---|---|---|
| JP | 2004-42844 | 2/2004 | |
| JP | 2005-219517 | 8/2005 | |
| WO | WO-2013099456 A1 * | 7/2013 | B60R 13/06 |

* cited by examiner

*Primary Examiner* — Jerry E Redman
(74) *Attorney, Agent, or Firm* — Casimir Jones, SC; Robert A. Goetz

(57) ABSTRACT

The present invention reduces leakage of water into an automotive vehicle, regardless of an inclination at which the automotive vehicle is parked and/or a volume of water. A sealing member of a sliding door in accordance with the present invention includes: a first inner wall (21); a first curved wall (22); a connection wall (24) connecting between the first inner wall (21) and the first curved wall (22); and a first water-conveying part (8) provided on a vehicle-exterior side surface of the first inner wall (21), the connection wall (24) having a hole (h1) at a position opposed to a front tip of the first water-conveying part (8), the hole (h1) being formed so as to lead to a hollow part (25), the water received by the first water-conveying part (8) flowing into the hollow part (25) through the hole (h1).

6 Claims, 4 Drawing Sheets

SEALING MEMBER OF SLIDING DOOR

This nonprovisional application claims the benefit of U.S. Provisional Application No. 62/925,651 filed on Oct. 24, 2019, the entire contents of all of which are hereby incorporated by reference.

TECHNICAL FIELD

The present invention relates to a sealing member of a sliding door of a center-pillarless automotive vehicle, which sealing member is provided in an upper area of an end portion of the sliding door.

BACKGROUND ART

Conventionally, there exists a center-pillarless automotive vehicle configured to include a sliding door and another door, which are movable independently of each other. In a case where the another door is a hinged door, the center-pillarless automotive vehicle may be configured such that (i) the hinged door is joined to a body of the center-pillarless automotive vehicle via a hinge and is rotated to be open and close, and (ii) the sliding door is opened and closed by means of a sliding mechanism.

Along a periphery of a body opening of an automotive vehicle of this type, a main weather strip 207 illustrated in FIG. 4 is provided as a main seal so that water can be prevented from entering the automotive vehicle. However, since a space is present between a door (hinged door) 101 and a sliding door 102, water leakage occurs. In order that this water leakage can be avoided, a sealing member 201 is provided in an upper area of a first end portion 101a of the door 101, and another sealing member 202 is provided in an upper area of a second end portion 102a of the sliding door 102. This leads to formation of a sealing surface.

Patent Literature 1 discloses a door weather strip which is attached to a front end portion of a rear door of a pillarless automotive vehicle. This door weather strip has a dam part, which is laterally provided so as to be in contact with a vehicle-interior side of a flange part of a door panel. The dam part is at a position a little lower than a top wall, which position is on an inner surface of a fitting attachment part of an upper-end die-molded part. Further, an outer surface of the fitting attachment part on a vehicle-interior side is provided with a water receiving part which is continuous with the dam part. Furthermore, on the outer surface of the fitting attachment part on the vehicle-interior side, provided is a drain hole, which allows the water receiving part and an empty space portion of a hollow sealing part to communicate with each other.

Patent Literature 2 discloses a door weather strip which is attached to a front end portion of a rear door of a pillarless automotive vehicle. The door weather strip is configured such that: (i) a sealing bead is laterally provided on a vehicle-interior side surface of a weather strip main body so as to be in close elastic contact with a door panel; (ii) a water receiving part is formed on a vehicle-exterior side surface of the weather strip main body; (iii) a drain hole is formed which allows the sealing bead and the water receiving part to communicate with each other; and (iv) a communicating path which allows the drain hole and a hollow part of the weather strip main body.

CITATION LIST

Patent Literature

[Patent Literature 1]
Japanese Patent Application Publication Tokukai No. 2004-42844 (Publication date: Feb. 12, 2004)
[Patent Literature 2]
Japanese Patent Application Publication Tokukai No. 2005-219517 (Publication Date: Aug. 18, 2005)

SUMMARY OF INVENTION

Technical Problem

However, the above-described conventional technique disclosed in the Patent Literature 1 has a problem in that depending on an inclination at which the automotive vehicle is parked and/or a volume of water, it may not be possible to receive all water by the water receiving part which is provided on the outer surface of the fitting attachment part on the vehicle-interior side. This may cause water to leak into the automotive vehicle.

Another conventional technique described above is illustrated in FIG. 5 of the present application, and FIG. 5 of the present application corresponds to FIG. 4 of Patent Literature 2. In the another conventional technique, since a wall member 311a at a top of a weather strip main body 311 is made of one continuous member, a relatively small volume of water enters between a vehicle-interior side surface of the weather strip main body 311 and a door panel 302 from the top of the weather strip main body 311.

However, in a case where the weather strip main body 311 is configured by necessity such that the wall member 311a at the top is discontinuous and is formed by overlapping two members, a relatively large volume of water enters between the vehicle-interior side surface of the weather strip main body 311 and the door panel 302 from the top of the weather strip main body 311. This may cause water to leak into the automotive vehicle.

An aspect of the present invention is attained in view of the present problems. A first object of the present invention is to provide a sealing member of a sliding door, which sealing member is capable of reducing leakage of water into an automotive vehicle, regardless of an inclination at which the automotive vehicle is parked and/or a volume of water.

Further, a second object of the present invention is to provide a sealing member of a sliding door, which sealing member is capable of reducing leakage of water into an automotive vehicle even in a case where a wall member at an upper end portion of a weather strip main body is discontinuous, that is, configured by overlapping two members.

Solution to Problem

In order to solve the above problems, a sealing member of a sliding door in accordance with an aspect of the present invention is a sealing member of a sliding door of a center-pillarless automotive vehicle, the sealing member of the sliding door being provided in an upper area of an end portion of the sliding door, the sealing member of the sliding door including: a first inner wall provided on a vehicle-interior side; a first curved wall configured to curve when brought into elastic contact with a sealing member of another door, the sealing member of the another door being provided in an upper area of an end portion of the another door; a connection part via which the first inner wall and the first curved wall are connected to each other, the connection part tapering as the connection part extends toward the sealing member of the another door; a connection wall connecting between the first inner wall and the first curved wall; and a first water-conveying part provided on a vehicle-exterior side surface of the first inner wall, the first water-conveying part being configured to receive water and convey the water from a rear side to a front side of the center-pillarless automotive vehicle, the first inner wall, the first curved wall, and the connection wall forming a hollow part in a region enclosed by the first inner wall, the first curved wall, and the connection wall, the connection wall having a hole at a position opposed to a front tip of the first water-conveying part, the hole being formed so as to lead to the hollow part, the water received by the first water-conveying part flowing into the hollow part through the hole. The above configuration can cause the water received by the first water-conveying part to flow into the hollow part through the hole. Therefore, leakage of water into an automotive vehicle can be reduced, regardless of an inclination at which the automotive vehicle is parked and/or a volume of water.

Further, the sealing member of the sliding door in accordance with an aspect of the present invention can be configured such that: the first water-conveying part is made of a sealing bead configured to dam the water received by the first water-conveying part. The above configuration can cause the water received by the sealing bead to flow into the hollow part through the hole.

Further, the sealing member of the sliding door in accordance with an aspect of the present invention can be configured such that: the first water-conveying part is made of a highly-foamed sealing member. With this configuration, part of the water received by the first water-conveying part can be absorbed by the highly-foamed sealing member. This makes it possible to further reduce leakage of water into an automotive vehicle.

Further, a sealing member of the sliding door in accordance with an aspect of the present invention is preferably configured to further include: a second water-conveying part on the vehicle-exterior side surface of the first inner wall and above the first water-conveying part, the second water-conveying part receiving water and conveying the water from the front side to the rear side, the second water-conveying part having a rear end portion which is arranged to be opposed to a rear end portion of the first water-conveying part so that the water received by the second water-conveying part flows into the first water-conveying part. This configuration can cause the water conveyed by the second water-conveying part to be received by the first water-conveying part.

Further, the sealing member of the sliding door in accordance with an aspect of the present invention can be configured such that: the second water-conveying part is made of a highly-foamed sealing member. With this configuration, part of the water received by the second water-conveying part can be absorbed by the highly-foamed sealing member. This makes it possible to further reduce leakage of water into an automotive vehicle.

Further, a sealing member of the sliding door in accordance with an aspect of the present invention can be configured to further include: an upper connection wall provided at an upper portion of the sealing member of the sliding door, the upper connection wall being configured to connect the first inner wall, the first curved wall, and the connection wall; and a protrusion wall provided on a rear side of the upper connection wall so as to protrude on a vehicle-exterior side, the protrusion wall being connected to the upper connection wall and the first inner wall, the protrusion wall receiving water, the upper connection wall and the protrusion wall being inclined downward toward the vehicle-interior side, the water received by the protrusion wall flowing into the hollow part via the upper connection wall. The above configuration can cause the water received by the protrusion wall to flow into the hollow part through the hole.

Advantageous Effects of Invention

An aspect of the present invention advantageously makes it possible to reduce leakage of water into an automotive vehicle, regardless of an inclination at which the automotive vehicle is parked and/or a volume of water. Further, an aspect of the present invention advantageously makes it possible to reduce leakage of water into an automotive vehicle even in a case where a wall member at an upper end of a weather strip main body is discontinuous, that is, configured by overlapping two members.

BRIEF DESCRIPTION OF DRAWINGS (a) of FIG. 1 is an elevational view illustrating a left door sealing structure in accordance with an embodiment of the present invention, as viewed from a vehicle-interior side. (b) of FIG. 1 is a cross sectional view which is taken along a line A-A shown in (a) of FIG. 1. (c) of FIG. 1 is a perspective view illustrating a main weather strip. (d) of FIG. 1 is a perspective view illustrating a structure of a main part of a second sealing member. (e) of FIG. 1 is a cross sectional view which is taken along a line B-B shown in (d) of FIG. 1.

(a) of FIG. 2 is a side view illustrating a left side part of a center-pillarless automotive vehicle from which left side part a sliding door and another door are both detached, as viewed from a vehicle-exterior side. (b) of FIG. 2 is a side view illustrating the left side part of the center-pillarless automotive vehicle to which left side part the sliding door and the another door are both attached.

(a) of FIG. 3 is a perspective view illustrating an appearance of the second sealing member, as viewed from a position that is close to a front side of a vehicle and on a vehicle-exterior side. (b) of FIG. 3 is a cross sectional view which is taken along a line C-C shown in (a) of FIG. 3. (c) of FIG. 3 is a cross sectional view which is taken along a line D-D shown in (a) of FIG. 3.

DESCRIPTION OF EMBODIMENTS

[Outline of Structure of Side Part of Center-Pillarless Automotive Vehicle]

Figure 2:
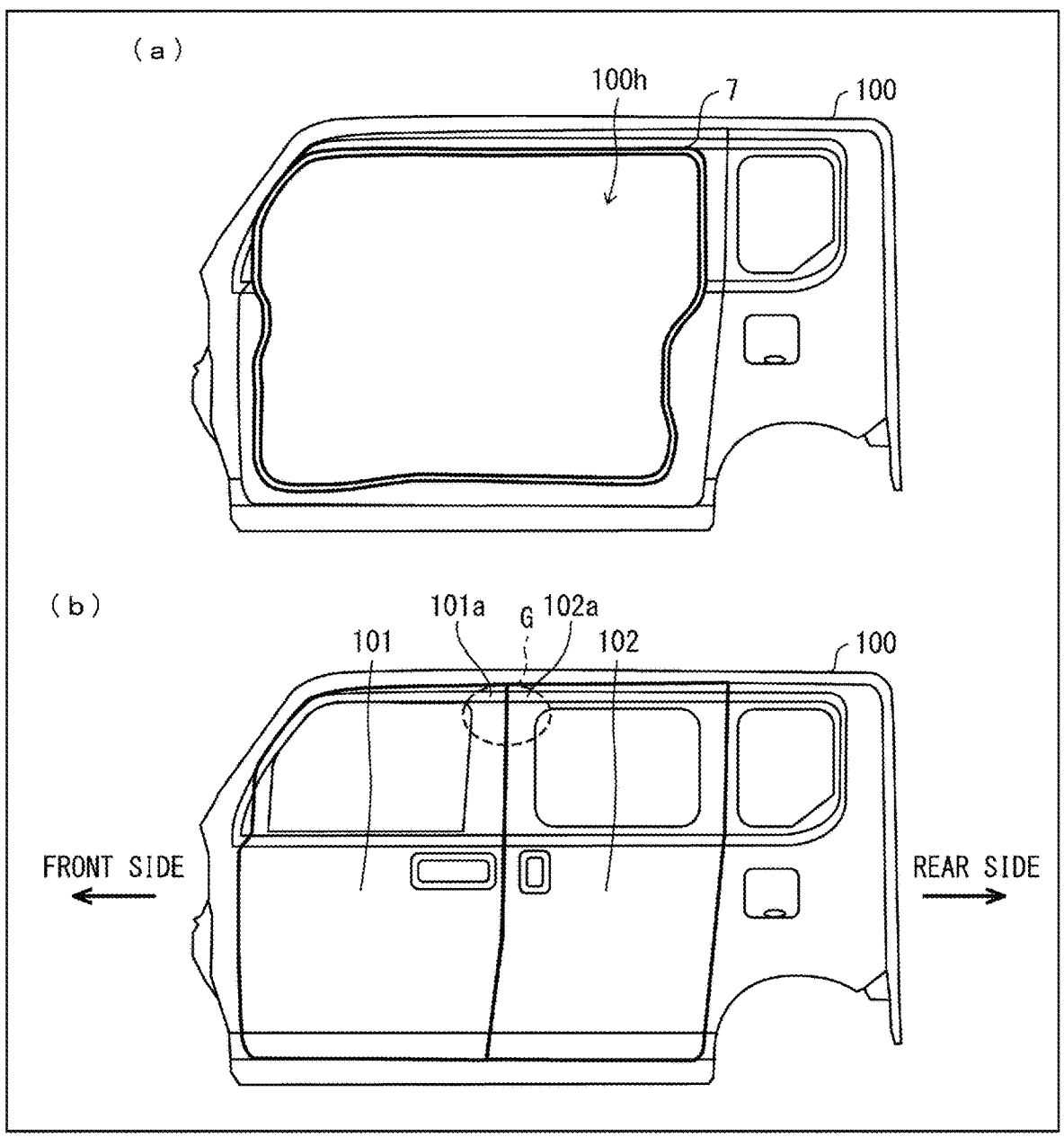

As illustrated in (a) of FIG. 2, a side part 100 of a center-pillarless automotive vehicle (hereinafter, simply referred to as an "automotive vehicle") has a body opening in which a center pillar is not present. A main weather strip 7 is provided along a periphery 100h of the body opening.

Figure 1:
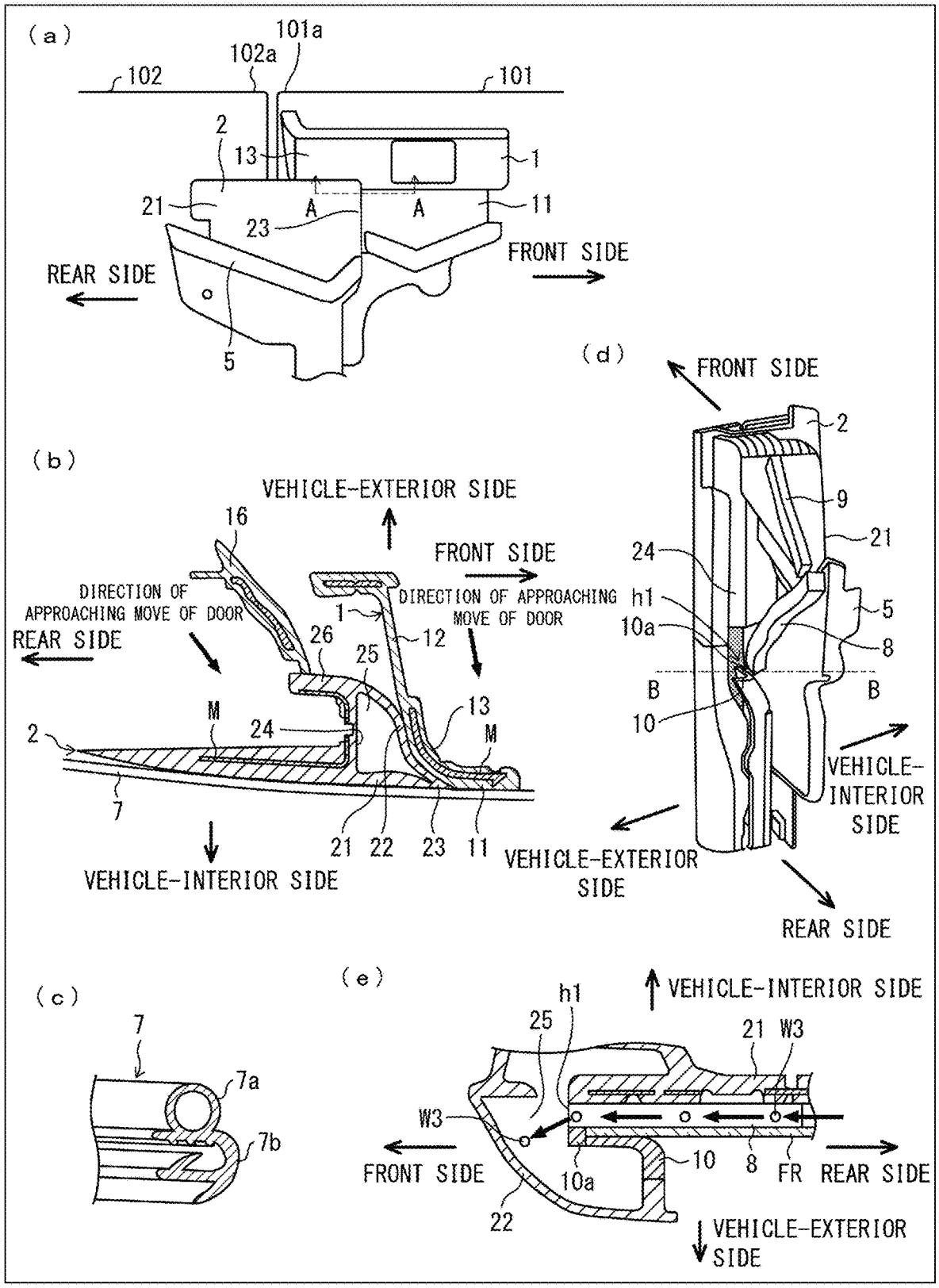

The main weather strip 7 includes a hollow sealing part 7a and an attachment base 7b (see (c) of FIG. 1).

Note that a sealing structure described below is a sealing structure of a part G at which a second end portion 102a of a sliding door 102 and a first end portion 101a of another door 101 meet each other, as illustrated in (b) of FIG. 2. More specifically, the sealing structure in accordance with the present embodiment is a sealing structure of a part at which the second end portion 102a of the sliding door 102, the first end portion 101a of the another door 101, and the main weather strip 7, which is provided along the periphery 100h of the body opening, meet each other.

[Outline of Sealing Structure]

A first sealing member (sealing member of the another door) 1 is provided in an upper area of the first end portion 101a of the another door 101 as illustrated in (a) of FIG. 1. The first sealing member 1 is a weather strip which is brought into elastic contact with the main weather strip 7 so that sealing performance between the first sealing member 1 and the main weather strip 7 is ensured.

Meanwhile, a second sealing member 2 (sealing member of the sliding door) is provided in an upper area of the second end portion 102a of the sliding door 102. The second sealing member 2 is a weather strip which is brought into elastic contact with the main weather strip 7 so that sealing performance between the second sealing member 2 and the main weather strip 7 is ensured. Note that (a) of FIG. 1 illustrates (i) the first sealing member 1 in a perspective view as viewed diagonally from above from a rear side of the automotive vehicle and (ii) the second sealing member 2 in an elevational view as viewed from a vehicle-interior side.

As a molding material for the first sealing member 1 and the second sealing member 2, an elastic material such as synthetic rubber or TPE (thermoplastic elastomer) is used. Examples of the synthetic rubber include EPDM (ethylene-propylene-diene copolymer rubber). Examples of the TPE (thermoplastic elastomer) include TPO (olefin-based thermoplastic elastomer). The elastic material for use as the molding material can be a foamed material or can be alternatively a non-foamed material. Furthermore, a core member made of metal, a hard and rigid resin, or the like can be embedded in the elastic material for the purpose of ensuring rigidity.

As illustrated in (a) of FIG. 1, a water receiving part 5 is provided on a first inner wall 21 of the second sealing member 2. Further, a drain hole (not illustrated), through which water received by the water receiving part 5 is drained to the exterior of the automotive vehicle, is provided in the vicinity of a bottom part of the water receiving part 5. This allows water, which is received by the water receiving part 5, to be ultimately discharged to the exterior of the automotive vehicle through the drain hole.

As illustrated in (b) of FIG. 1, the second sealing member 2 includes the first inner wall 21, a first curved wall 22, and a connection wall 23. The first inner wall 21 is located on the vehicle-interior side. The first curved wall 22 is curved in a case where the first curved wall 22 is brought into elastic contact with the first sealing member 1. The first inner wall 21 and the first curved wall 22 are connected to each other via the connection part 23, which is tapered as the connection part 23 extends toward the first sealing member 1.

Meanwhile, the first sealing member 1 includes a second inner wall 11, a third inner wall 12, and a second curved wall 13. The second curved wall 13 is located on the vehicle-interior side. The third inner wall 12 is brought into elastic contact with the second sealing member 2. The second inner wall 11 and the third inner wall 12 are connected to each other via the second curved wall 13, which is curved so as to protrude toward the second sealing member 2.

Note that (b) of FIG. 1 illustrates a state in which the first curved wall 22 of the second sealing member 2 and the third inner wall 12 (or the second curved wall 13) of the first sealing member 1 have been brought into elastic contact with each other. As illustrated in (b) of FIG. 1, in a case where the first curved wall 22 is in elastic contact with the third inner wall 12, the first curved wall 22 is elastically deformed, so that the first curved wall 22 is brought into close contact with the third inner wall 12. This ensures sealing performance between the first curved wall 22 and the third inner wall 12.

[Structure of Second Sealing Member]

As illustrated in (b) of FIG. 1, the second sealing member 2 is provided with a connection wall 24 between the first inner wall 21 and the first curved wall 22 so as to connect the first inner wall 21 and the first curved wall 22. In a region enclosed by the first inner wall 21, the first curved wall 22, and the connection wall 24, a hollow part 25 is formed. On a rear side of the connection wall 24, a first vehicle-exterior wall 26 is provided. The first vehicle-exterior wall 26 is substantially parallel to the first inner wall 21. Further, on a vehicle-exterior side of the first vehicle-exterior wall 26, a parting seal 16 is provided.

As illustrated (d) and (e) of FIG. 1, a vehicle-exterior side surface of the first inner wall 21 is provided with a first water-conveying part 8 which is configured to receive and convey water from the rear side to a front side of the automotive vehicle. As illustrated in (d) of FIG. 1, the first water-conveying part 8 is inclined such that a rear end portion of the first water-conveying part 8 is at a higher position than a front end portion of the first water-conveying part 8. This can cause the water received by the first water-conveying part 8 to flow from the rear side to the front side and further into the hollow part 25 through a hole h1.

The first water-conveying part 8 can be a sealing bead configured to dam water which is received. This can cause the water received by the sealing bead to flow into the hollow part 25 through the hole h1. Further, the first water-conveying part 8 can be made of a highly-foamed sealing member. With this configuration, part of the water received by the first water-conveying part 8 can be absorbed by the highly-foamed sealing member. This makes it possible to further reduce leakage of water into the automotive vehicle.

Note that in consideration of an inclination at which the automotive vehicle is parked, the first water-conveying part 8 is inclined such that inclination of the first water-conveying part 8 is substantially parallel to inclination of the water receiving part 5. This configuration is intended to prevent the water received by the first water-conveying part 8 from flowing from the front side to the rear side.

Further, the hole h1, which leads to the hollow part 25, is formed in the connection wall 24 at a position where the connection wall 24 is opposed to a front end of the first water-conveying part 8. Accordingly, the water received by the first water-conveying part 8 is caused to flow into the hollow part 25 through the hole h1.

The above configuration can cause the water received by the first water-conveying part 8 to flow into the hollow part 25 through the hole h1. Therefore, leakage of water into the automotive vehicle can be reduced, regardless of an inclination at which the automotive vehicle is parked and/or a volume of water.

Further, the vehicle-exterior side surface of the first inner wall 21 is provided with a second water-conveying part 9, above the first water-conveying part 8. The second water-conveying part 9 is configured to receive and convey water from the front side to the rear side. The second water-conveying part 9 is inclined such that a front end portion of the second water-conveying part 9 is at a higher position than a rear end portion of the second water-conveying part 9. With this configuration, the water received by the second water-conveying part 9 is caused to flow from the front side to the rear side. Then, the water, which has reached the rear end portion of the second water-conveying part 9, falls toward the vicinity of the rear end portion of the first water-conveying part 8. At the same time, other part of the water that has reached the rear end portion of the second water-conveying part 9, that is, water W, is conveyed to the water receiving part 5 which is provided on the vehicle-interior side of the first inner wall 21.

Note that the second water-conveying part 9 can be made of a highly-foamed sealing member. With this configuration, part of the water received by the second water-conveying part 9 can be absorbed by the highly-foamed sealing member. This makes it possible to further reduce leakage of water into the automotive vehicle.

It is preferable that the rear end portion of the second water-conveying part 9 be provided so as to be opposed to the rear end portion of the first water-conveying part 8 so that the water received by the second water-conveying part 9 is caused to flow into the first water-conveying part 8. This can cause the water conveyed by the second water-conveying part 9 to be received by the first water-conveying part 8.

Further, as illustrated in (e) of FIG. 1, a rear end portion of the first curved wall 22 is connected with an L-shaped wall 10 which extends from the rear side to the front side and bends in the shape of letter L. At a front end of the L-shaped wall 10, a protrusion 10*a* is provided. The protrusion 10*a* is arranged such that a vehicle-interior side surface of the protrusion 10*a* is in contact with a vehicle-exterior side surface of the first water-conveying part 8. In this configuration, insertion of a flange FR into an area surrounded by the L-shaped wall 10, the protrusion 10*a* and the first water-conveying part 8 results in elastic contact of the flange FR with the L-shaped wall 10, the protrusion 10*a*, and the first water-conveying part 8, which are provided on an attachment surface (inner surface) of the second sealing member 2 and serve as sealing members.

Figure 3:
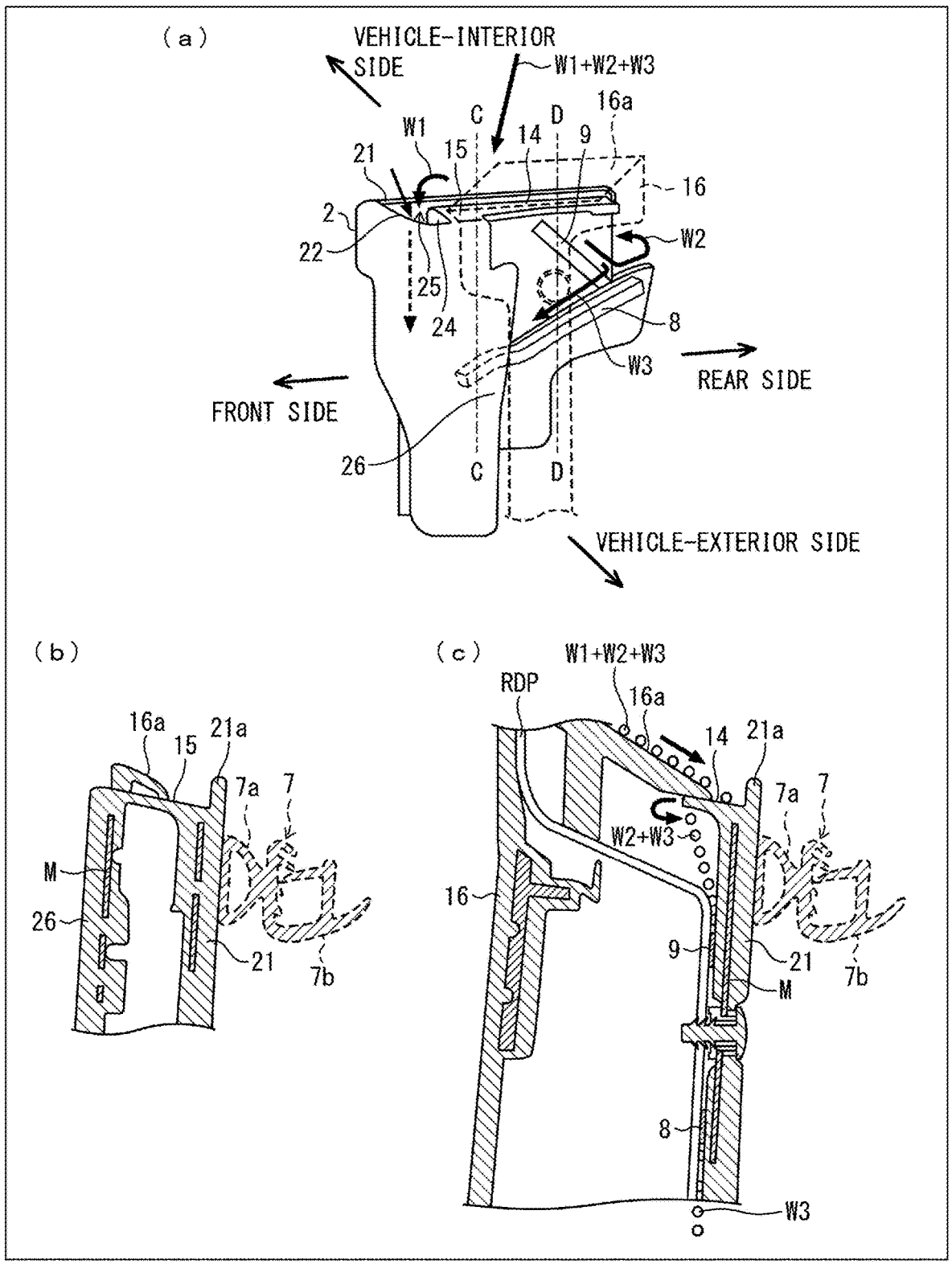
Figure 4:
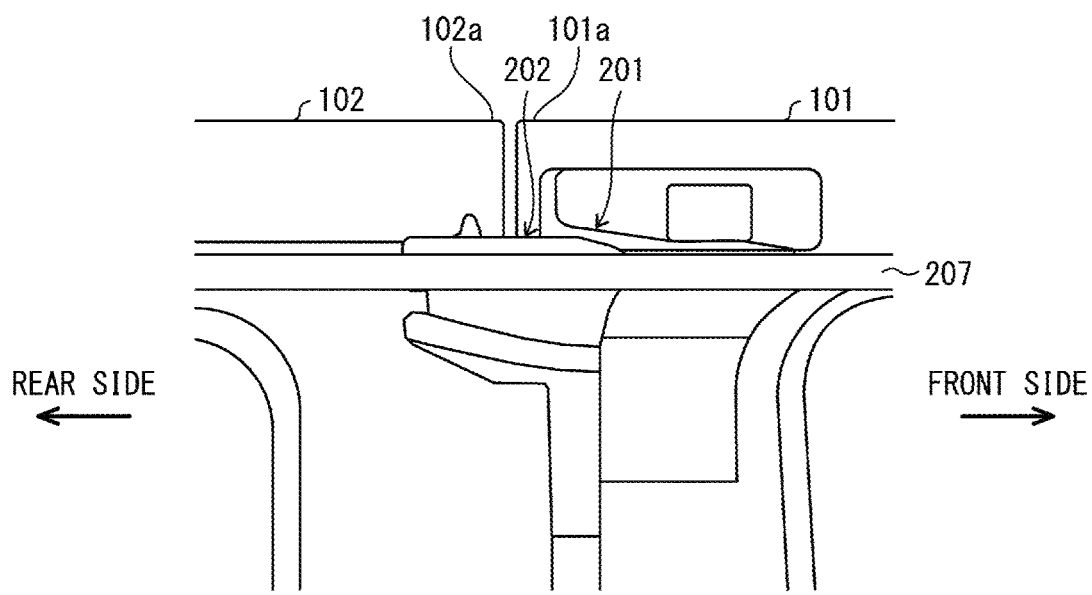
FIG. 4 is an elevational view illustrating a conventional left door sealing structure (including a main weather strip), as viewed from a vehicle-interior side.

Further, as illustrated in (a) of FIG. 3, the second sealing member 2 is provided, at an upper portion thereof, with an upper connection wall 15 which connects the first inner wall 21, the first curved wall 22, and the connection wall 24. The upper connection wall 15 is provided, on a rear side thereof, with a protrusion wall 14 which is connected to the upper connection wall 15 and the first inner wall 21 and which protrudes on a vehicle-exterior side.

The upper connection wall 15 and the protrusion wall 14 are inclined downward toward the vehicle-interior side. The upper connection wall 15 and the protrusion wall 14 are also inclined downward toward the front side such that water flows from the rear side to the front side.

This can cause water received by the protrusion wall 14 to flow into the hollow part 25 via the upper connection wall 15.

(b) of FIG. 3 is a cross sectional view which is taken along a line C-C shown in (a) of FIG. 3. As illustrated in (b) of FIG. 3, an upper portion of the upper connection wall 15 is brought into contact with an inclined wall 16*a* of the parting seal 16. (c) of FIG. 3 is a cross sectional view which is taken along a line D-D shown in (a) of FIG. 3. As illustrated in (c) of FIG. 3, an upper portion of the protrusion wall 14 is brought into contact with the inclined wall 16*a* of the parting seal 16.

Figure 5:
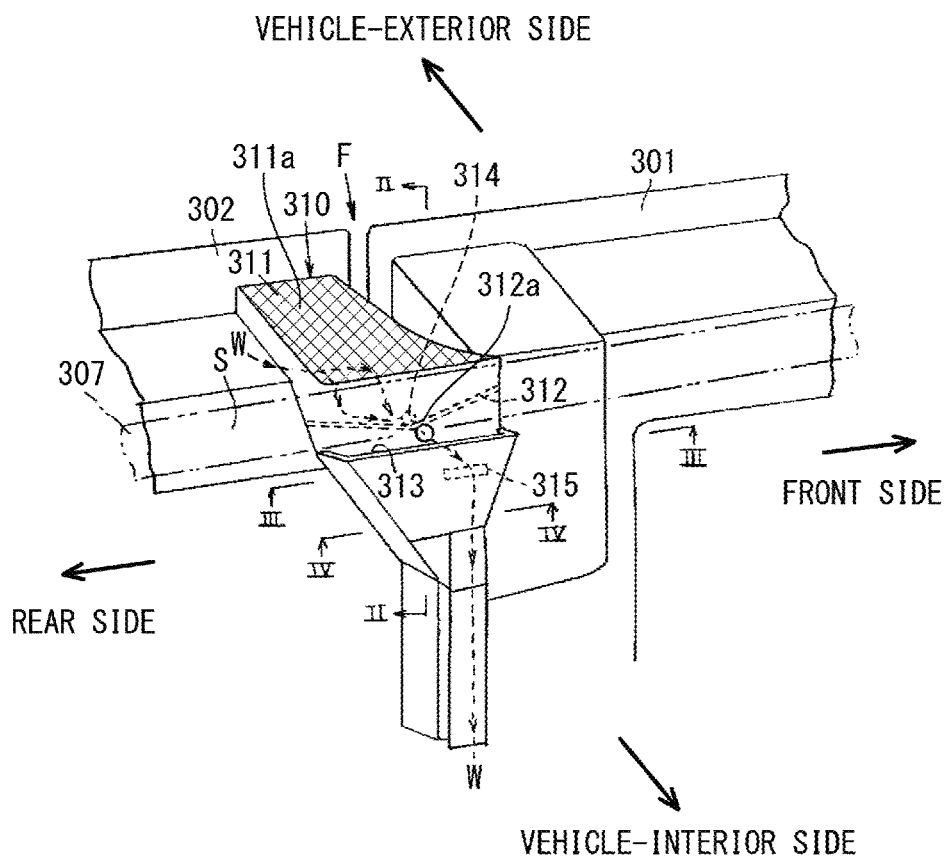
FIG. 5 is a perspective view illustrating a configuration of a main part of a conventional left door sealing structure (including a main weather strip), as viewed from a vehicle-interior side.

As illustrated in FIG. 5, in a case where a weather strip main body 311 has, at an upper end portion thereof, a wall member 311*a* which is made of one continuous member, a relatively small volume of water enters between a vehicle-interior side surface of the weather strip main body 311 and a door panel 302, from the upper end portion of the weather strip main body 311.

However, in a case where it is necessary to have a configuration, as illustrated in (c) of FIG. 3, in which (i) the second sealing member 2 and the parting seal 16 are separate parts and (ii) the protrusion wall 14 of the second sealing member 2 and the inclined wall 16*a* of the parting seal 16 are overlapped with each other, there arises a problem in that a relatively larger volume of the water enters between the vehicle-interior side surface and a rear door panel RDP from an upper end portion of the second sealing member 2. This may cause water to leak into the automotive vehicle.

In an example of Embodiment 1 as illustrated in (b) of FIG. 1, it is necessary that even in a state in which the first second sealing member 1 and the main weather strip 7 are in elastic contact with each other, the connection part 23 does not bend when the second sealing member 2 approaches by sliding from the rear side and enters between the first second sealing member 1 and the main weather strip 7. For this purpose, the connection part 23 is made of a non-foamed material which is die-molded so that the connection part 23 has a sufficient rigidity.

On the other hand, with regard to the inclined wall 16*a* of the parting seal 16, water tightness is considered more important. Accordingly, the inclined wall 16*a* is made of a foamed material which is die-molded. On this account, the protrusion wall 14 of the second sealing member 2 and the inclined wall 16*a* of the parting seal 16 have to be made of different mold materials, respectively.

In such a structure, a lot of water W1+W2+W3 enters from between the second end portion 102*a* of the sliding door 102 and the first end portion 101*a* of the another door 101 which are illustrated in (a) of FIG. 1. Then, when the water flows down along the inclined wall 16*a* of the parting seal 16, most (water W1) of such a lot of water W1+W2+ W3, which has entered, is kept back by an extension wall 21*a* of the first inner wall 21. This is because (i) the inclined wall 16*a* of the parting seal 16 is overlapped with the protrusion wall 14 of the second sealing member 2 such that the inclined wall 16*a* is put on an upper surface of the protrusion wall 14 from a substantially middle position of the upper surface and (ii) the extension wall 21*a* of the first inner wall 21 is provided, on a vehicle-interior side of the first inner wall 21, so as to be present at a higher position than the protrusion wall 14.

In the above configuration, the inclined wall 16*a* and the extension wall 21*a* are provided so as not to be in contact with each other. This allows the inclined wall 16*a*, the protrusion wall 14, and the extension wall 21*a* to form a gutter shape. Therefore, even when the volume of the water W1 is large, the water W1 never enters the hollow sealing part 7*a* of the main weather strip 7.

Thereafter, the water W1 can be directly drained into the hollow part 25 of the second sealing member 2, since the protrusion wall 14 and the upper connection wall 15 connected to the protrusion wall 14 have a downward inclination toward the front side.

With regard to the water W2+W3 which has passed between the inclined wall 16*a* of the parting seal 16 and the protrusion wall 14 of the second sealing member 2 and has reached the rear end portion of the second water-conveying part 9, part (water W2) of the water W2+W3 is conveyed to the water receiving part 5 which is provided on the vehicle-interior side of the first inner wall 21. Meanwhile, at a substantially middle position in height of the second sealing member 2, a certain volume of the water W2 is drained to the vehicle-exterior side.

At the end, a small volume of remaining water W3, which has dropped in the vicinity of the rear end portion of the first water-conveying part 8, does not enter the automotive vehicle, but flows into the hollow part 25 through the hole h1 and drained. This is because the L-shaped wall 10, the protrusion 10a, and the first water-conveying part 8, which are provided on the attachment surface (inner surface) of the second sealing member 2 and serve as the sealing members, are brought into elastic contact with the flange FR, as illustrated in (e) of FIG. 1.

In this way, the second sealing member 2 has a structure which makes it possible to drain water, which has entered from between the second end portion 102a of the sliding door 102 and the first end portion 101a of the another door 101, to the vehicle-exterior side step by step at three portions including an upper portion, a middle portion, and a lower portion. This makes it possible to prevent water from entering the automotive vehicle.

Further as illustrated in (a) of FIG. 3, the position of the front end portion of the second water-conveying part 9 is arranged to be located at a substantially middle position of the first water-conveying part 8. In this configuration, the first water-conveying part 8 is still present directly below a connection between the inclined wall 16a and the protrusion wall 14, even in a vehicle where the flange FR (see (e) of FIG. 1), which is a part of a rear door panel RDP, is not present in an area from a position in the vicinity of the front end portion of the second water-conveying part 9 to the rear end portion of the second water-conveying part 9. Accordingly, the water which has entered can be received and drained into the hollow part 25 through the hole h1 (illustration is omitted).

Further, (d) of FIG. 1 and (a) of FIG. 3 each illustrate a view of the first water-conveying part 8 whole of which is made of a highly-foamed sealing member having a cross section of a substantially rectangular shape. The whole of the first water-conveying part 8 can be alternatively made of a sealing bead having a cross section of a substantially semicircular shape, a substantially triangular shape, a substantially bar shape, or the like. As a further alternative, the first water-conveying part 8 can have a structure in which both of a highly-foamed sealing member and a sealing bead are used and overlapped with each other.

Note that the sealing bead is made of a die-molded material, and the shape of the sealing bead is formed while the second sealing member 2 is being die-molded. Further, after die-molding of the second sealing member 2, the highly-foamed sealing member is bonded to the second sealing member 2 by an adhesive material which is combined with the highly-foamed sealing member.

According to an example of the present embodiment, at least a portion in the vicinity of a front lower end of the first water-conveying part 8 illustrated in (e) of FIG. 1 is made of a sealing bead (made of a die-molded material). Further, this sealing bead is connected and combined with the protrusion 10a which is provided at an end of the L-shaped wall 10. This produces a structure in which the portion in the vicinity of the front lower end of the first water-conveying part 8, the protrusion 10a, and the L-shaped wall 10 are continuous and combined with each other. This makes it possible to provide a structure which is less likely to cause water leakage.

Further, as illustrated in (b) of FIG. 1, a rear portion of the first inner wall 21, the connection wall 24, and the first vehicle-exterior wall 26 of the second sealing member 2 form a substantially U-shaped portion. In this substantially U-shaped portion, a metal core material is embedded. On this account, the highly-foamed sealing member is attached, manually by a person, at least up to the portion in the vicinity of the front lower end of the first water-conveying part 8, after die-molding. In this case, it is difficult to stretch and extend each of the L-shaped wall 10 and the protrusion 10a. In a case where bonding of the highly-foamed sealing member is attempted by forcibly stretching the L-shaped wall 10 and/or the protrusion 10a, a portion thus stretched may stay deformed in a stretched state or in the worst case, the portion may be torn. In light of this, it is preferable that the portion in the vicinity of the front lower end of the first water-conveying part 8 be made of a sealing bead (made of a die-molded material).

In a case where at least the portion in the vicinity of the front lower end of the first water-conveying part 8 is made of a sealing bead (made of a die-molded material), the whole of the first water-conveying part 8 can be made of the sealing bead. Alternatively, it is possible to provide the first water-conveying part 8 by (i) making, with use of a sealing bead (made of a die-molded material), at least the portion in the vicinity of the front lower end of the first water-conveying part 8, for example, a portion illustrated in (e) of FIG. 1 and (ii) bonding a highly-foamed sealing member so that the highly-foamed sealing member overlaps on an upper surface of a rear upper end portion of the sealing bead (made of a die-molded material), in the vicinity of an end of the first vehicle-exterior wall 26 (i.e., position where there is no obstacle and a person can easily bond the highly-foamed sealing member manually).

[Supplemental Remarks]

The above-described embodiment illustrates the case of a left door, and showed an only example in which the another door 101 is a hinged door and attached as a side front door while the sliding door 102 is attached as a side rear door. However, the present invention is also applicable to a right door and also to a back door.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1 first sealing member (sealing member of another door)
2 second sealing member (sealing member of sliding door)
7 main weather strip
8 first water-conveying part
9 second water-conveying part
10 L-shaped wall
10a protrusion
11 second inner wall
12 third inner wall
13 second curved wall
14 protrusion wall
15 upper connection wall
16 parting seal 16a inclined wall
21 first inner wall
22 first curved wall
23 connection part
24 connection wall
25 hollow part
26 first vehicle-exterior wall
100h periphery of body opening
101 another door
101a first end portion
102 sliding door
102a second end portion
h1 hole
FR flange
W water

The invention claimed is:

1. A sealing member of a sliding door of a center-pillarless automotive vehicle, the sealing member of the sliding door being provided in an upper area of an end portion of the sliding door, the sealing member of the sliding door comprising:
   a first inner wall provided on a vehicle-interior side; a first curved wall configured to curve when brought into elastic contact with a sealing member of another door, the sealing member of the another door being provided in an upper area of an end portion of the another door;
   a connection part via which the first inner wall and the first curved wall are connected to each other, the connection part tapering as the connection part extends toward the sealing member of the another door;
   a connection wall connecting between the first inner wall and the first curved wall; and
   a first water-conveying part provided on a vehicle-exterior side surface of the first inner wall, the first water-conveying part being configured to receive water and convey the water from a rear side to a front side of the center-pillarless automotive vehicle,
   the first inner wall, the first curved wall, and the connection wall forming a hollow part in a region enclosed by the first inner wall, the first curved wall, and the connection wall,
   the connection wall having a hole at a position opposed to a front tip of the first water-conveying part, the hole being formed so as to lead to the hollow part,
   the water received by the first water-conveying part flowing into the hollow part through the hole.

2. The sealing member of the sliding door as set forth in claim 1, wherein:
   the first water-conveying part is made of a sealing bead configured to dam the water received by the first water-conveying part.

3. The sealing member of the sliding door as set forth in claim 1, wherein:
   the first water-conveying part is made of a foamed sealing member.

4. A sealing member of the sliding door as set forth in claim 1, further comprising:
   a second water-conveying part on the vehicle-exterior side surface of the first inner wall and above the first water-conveying part, the second water-conveying part receiving water and conveying the water from the front side to the rear side,
   the second water-conveying part having a rear end portion which is arranged to be opposed to a rear end portion of the first water-conveying part so that the water received by the second water-conveying part flows into the first water-conveying part.

5. The sealing member of the sliding door as set forth in claim 4, wherein:
   the second water-conveying part is made of a foamed sealing member.

6. A sealing member of the sliding door as set forth in claim 1, further comprising:
   an upper connection wall provided at an upper portion of the sealing member of the sliding door, the upper connection wall being configured to connect the first inner wall, the first curved wall, and the connection wall; and
   a protrusion wall provided on a rear side of the upper connection wall so as to protrude on a vehicle-exterior side, the protrusion wall being connected to the upper connection wall and the first inner wall, the protrusion wall receiving water,
   the upper connection wall and the protrusion wall being inclined downward toward the vehicle-interior side,
   the water received by the protrusion wall flowing into the hollow part via the upper connection wall.

* * * * *